United States Patent

Supino et al.

[11] Patent Number: 5,917,784
[45] Date of Patent: Jun. 29, 1999

[54] TRELLIS SEQUENCE DETECTOR FOR DETECTING A QUADRATURE SERVO SIGNAL IN DISK RECORDING SYSTEMS

[75] Inventors: Louis Supino; Paul M. Romano, both of Boulder; Jim Graba, Longmont, all of Colo.

[73] Assignee: Cirrus Logic, Inc., Fremont, Calif.

[21] Appl. No.: 09/054,584

[22] Filed: Apr. 3, 1998

[51] Int. Cl.[6] .................................................. G11B 17/22
[52] U.S. Cl. .......................................... 369/32; 369/44.28
[58] Field of Search ................................... 369/32, 44.28, 369/44.26, 44.27, 44.29, 44.34, 44.35, 44.41

[56] References Cited

U.S. PATENT DOCUMENTS

| | | |
|---|---|---|
| 3,665,413 | 5/1972 | Walsh et al. . |
| 4,849,764 | 7/1989 | van Heyningen . |
| 5,038,334 | 8/1991 | Uchikoshi et al. . |
| 5,121,371 | 6/1992 | Farnsworth et al. .................. 369/44.26 |
| 5,291,471 | 3/1994 | Russell . |
| 5,291,499 | 3/1994 | Behrens et al. . |
| 5,365,060 | 11/1994 | Shirai . |
| 5,402,400 | 3/1995 | Hamada et al. ........................... 369/32 |
| 5,444,682 | 8/1995 | Yamada et al. . |
| 5,559,770 | 9/1996 | Hiroki et al. . |
| 5,602,820 | 2/1997 | Wickramasinghe et al. . |
| 5,633,846 | 5/1997 | Okuyama et al. .................... 369/44.34 |
| 5,835,295 | 11/1998 | Behrens ..................................... 360/51 |

*Primary Examiner*—Tan Dinh
*Attorney, Agent, or Firm*—Howard H. Sheerin; Dan A. Shifrin

[57] ABSTRACT

A trellis sequence detector is disclosed for detecting a quadrature servo signal in optical disk storage devices. The quadrature servo signal is generated in discrete time and comprises two sinusoidal signals phase offset by 90 degrees. The sampling frequency of the quadrature signal is controlled relative to the track crossing velocity so as to produce a fixed number of samples per period of the sinusoid (i.e., per track crossing). In the embodiment disclosed herein, the sampling of the sinusoidal signals is controlled such that there are eight samples per track crossing. The eight samples are associated with a state transition diagram and corresponding trellis diagram which define the operation of a trellis sequence detector. The trellis sequence detector processes the actual samples of the quadrature signal to determine an estimated quadrature sequence closest to the actual samples of the quadrature signal. In this manner, spurious pulses in the actual quadrature signal are filtered out which significantly enhances the performance of the servo system.

18 Claims, 11 Drawing Sheets

5,917,784

TRELLIS SEQUENCE DETECTOR FOR DETECTING A QUADRATURE SERVO SIGNAL IN DISK RECORDING SYSTEMS

CROSS REFERENCE TO RELATED APPLICATIONS AND PATENTS

This patent is related to other co-pending U.S. patent applications, namely application Ser. No. 08/912,916 entitled "DIFFERENTIAL PHASE ERROR DETECTOR USING DUAL ARM CORRELATION FOR SERVO TRACKING IN AN OPTICAL DISK STORAGE DEVICE", and Ser. No. 08/989,272 entitled "GENERATING A QUADRATURE SEEK SIGNAL FROM A DISCRETE-TIME TRACKING ERROR SIGNAL AND A DISCRETE-TIME RF DATA SIGNAL IN AN OPTICAL STORAGE DEVICE." This patent is also related to U.S. Pat. No. 5,291,499 entitled "METHOD AND APPARATUS FOR REDUCED-COMPLEXITY VITERBI-TYPE SEQUENCE DETECTORS." The foregoing U.S. patent applications and U.S. patent are hereby incorporated by reference.

FIELD OF INVENTION

The present invention relates to optical disk storage systems, particularly to a trellis sequence detector for detecting a quadrature servo signal for use in counting track crossings during a seek operation.

BACKGROUND OF THE INVENTION

Optical disk drives, such as compact disks (CDs) and digital video disks (DVDs), are commonly used for storing large amounts of digital data on a single disc for use in audio/video or computer applications, and the like. The data on an optical disc is typically recorded as a series of "pits" arranged in tracks, where the length of the pit determines the presence of a digital "0" bit or a "1" bit. To read this recorded data, a servo system focuses a laser beam onto the surface of the disc such that the characteristics of the reflected beam allow detection of the data pits.

To this end, the servo system performs four operations: (1) a capture operation to "pull-in" the initial focus position, (2) a seek operation to move the beam radially over the surface of the disk to a desired track, (3) a centerline tracking operation to maintain the beam over the centerline of the selected track while reading the recorded data, and (4) a focus tracking operation to maintain proper focus as the disk spins over the beam.

Conventional optical disk drives use a head assembly comprised of a laser diode for generating the laser beam which is focused onto the surface of the optical disk through an objective lens. FIG. 1 illustrates a typical optical head assembly, the operation of which is well known by those skilled in the art. A laser diode 1 produces a light beam 2 which passes through a polarization beam splitter 3 and a collimator lens (not shown). The light beam 2 is then reflected by a prism 4, through an object lens (OL) 5, and onto the surface of the optical disk (not shown). The beam 2 reflects off the optical disc, again passes through the OL 5, and then reflects off prism 4 back toward the polarization prism 3 which deflects the beam 2 onto a four-quadrant photodetector 6. The signals output by the four-quadrant photodetector 6 are used to generate a focus error signal for focusing the OL 5 and a tracking error signal for tracking the centerline of the selected track. The four-quadrant photodetector 6 also generates an RF read signal for reading the recorded data.

In order to position the read head over a selected track during a seek operation, the entire sled assembly 8 slides radially along a lead screw 9 underneath the optical disc until the read head is positioned near the desired track. This coarse positioning (or coarse seeking) is accomplished by rotating the lead screw 9 in a clockwise or counterclockwise direction. Once near the selected track, OL voice coil motors (VCMs) (10A,10B) rotate an OL carriage unit 11 about a plastic hinge 12 in a "fine seeking" operation until the OL 5 is positioned directly over the desired track. Then, as the disk rotates and the track passes under the read head, the OL VCMs (10A,10B) perform fine adjustments in a "tracking" operation in order to maintain the position of the OL 5 over the centerline of the selected track as information is read from the disc.

The OL VCMs (10A,10B) also move the OL carriage unit 11 up and down in the direction shown in order to "capture" and "track" the OL 5 focus position. For focus capture and focus tracking the four-quadrant photodetector 6 generates an astigmatic focus error signal indicative of the distance between the OL 5 and the optical disc. At the beginning of a capture operation, the OL carriage unit 11 is initially positioned sufficiently away from the disc so that it is out of focus. Then the OL VCMs (10A, 10B) slowly move the OL carriage unit 11 toward the disc with the focus servo loop open until the quadrant photodetector 6 indicates that the OL 5 is within its focus pull-in range. Once within the pull-in range, the focus servo loop is closed and the initial focus point is captured. Thereafter, the OL VCMs (10A,10B) track the in-focus position in response to the astigmatic focus error signal as the read head seeks to selected tracks and reads data from the disc.

Several methods have been employed in the prior art for generating the tracking error signal used to maintain the optical transducer over the centerline of the selected track during a read operation. One method, referred to as differential phase detection (DPD), measures the phase offset between a pair of diagonal signals generated by the four-quadrant photodetector 6 to determine the position error as illustrated in FIG. 2A–2C. It should be noted that other types of photodetectors, such as a holographic photodetector, could be used to generate the diagonal signals. FIG. 2A shows three situations when the pit image is detected by the photodetector 6: left of center, at the center, and right of center. FIG. 2B shows the resulting diagonal signals generated by adding the (A+C) quadrants and the (B+D) quadrants, where the phase difference between these signals represents the position error. The position error signal (PES) is computed by converting the diagonal signals (A+C) and (B+D) into polarity square waves, as shown in FIG. 2C, and then extracting the offset or time difference between the square waves. The time difference is then integrated to generate the tracking error signal applied to the OL VCMs (10A,10B).

A problem with the above-described prior art method for generating the tracking error signal is that the differential phase error detector is dependent on the spectral content of the data being read from the disk. Thus, the randomness of the recorded data results in gain variance in the servo tracking loop; to compensate for the gain variance, the tracking servo loop is normally operated at a low (sub-optimal) bandwidth. Another drawback of prior art differential phase error detectors is a phenomenon known as "lens shift", an effective skew introduced into the diagonal signals due to generating the position error signal in continuous time.

During the seek operation, the position of the light beam on the disk is estimated by detecting track crossings. A track counter circuit increments/decrements a counter when it detects that the light beam has crossed a track. When the counter reaches a target value, the light beam will be on or near the target track. In the prior art, track crossings are typically estimated by detecting zero crossings or peaks in the continuous time tracking error signal (TES). The problem with this technique, of course, is that noise in the continuous TES signal may introduce spurious pules which can result in misdetected or falsely detected track crossings. Various prior art methods have been employed to reduce errors in the track crossing detector. For example, U.S. Pat. No. 5,199,017 employs hysteresis to prevent the detection of two consecutive positive or negative peaks in the TES, and U.S. Pat. No. 5,457,671 employs a "window signal" wherein TES zero crossings are detected only within a predetermined window, and if not detected then one is inserted.

In another prior art method for seeking a quadrature signal is generated from the TES signal and the data signal (i.e., the RF baseband signal) for use in counting track crossings as well as for determining the head's radial direction as it moves across the disk (i.e., radially in or out). Determining the radial direction of movement is important when the seek velocity is below the run-out velocity where the eccentricity of the disk can cause the direction of track crossings to actually reverse direction. The prior art methods for generating a quadrature signal from the TES and RF baseband signals are analog in nature. The above referenced copending U.S. patent application entitled "GENERATING A QUADRATURE SEEK SIGNAL FROM A DISCRETE-TIME TRACKING ERROR SIGNAL AND A DISCRETE-TIME RF DATA SIGNAL IN AN OPTICAL STORAGE DEVICE" discloses a method for generating the quadrature signal in discrete time which overcomes drawbacks inherent in the prior art analog methods. The present invention discloses further advantages and improvements to this previously disclosed discrete time quadrature signal generator.

SUMMARY OF THE INVENTION

A trellis sequence detector is disclosed for detecting a quadrature servo signal in optical disk storage devices. The quadrature servo signal is generated in discrete time and comprises two sinusoidal signals phase offset by 90 degrees. The sampling frequency of the quadrature signal is controlled relative to the track crossing velocity so as to produce a fixed number of samples per period of the sinusoid (i.e., per track crossing). In the embodiment disclosed herein, the sampling of the sinusoidal signals is controlled such that there are eight samples per track crossing. The eight samples are associated with a state transition diagram and corresponding trellis diagram which define the operation of a trellis sequence detector. The trellis sequence detector processes the actual samples of the quadrature signal to determine an estimated quadrature sequence closest to the actual samples of the quadrature signal. In this manner, spurious pulses in the actual quadrature signal are filtered out which significantly enhances the performance of the servo system.

BRIEF DESCRIPTION OF THE DRAWINGS

The above and other aspects and advantages of the present invention will be better understood by reading the following detailed description of the invention in view of the drawings, wherein.

DETAILED DESCRIPTION OF THE PREFERRED EMBODIMENT

Overview

Figure 4:
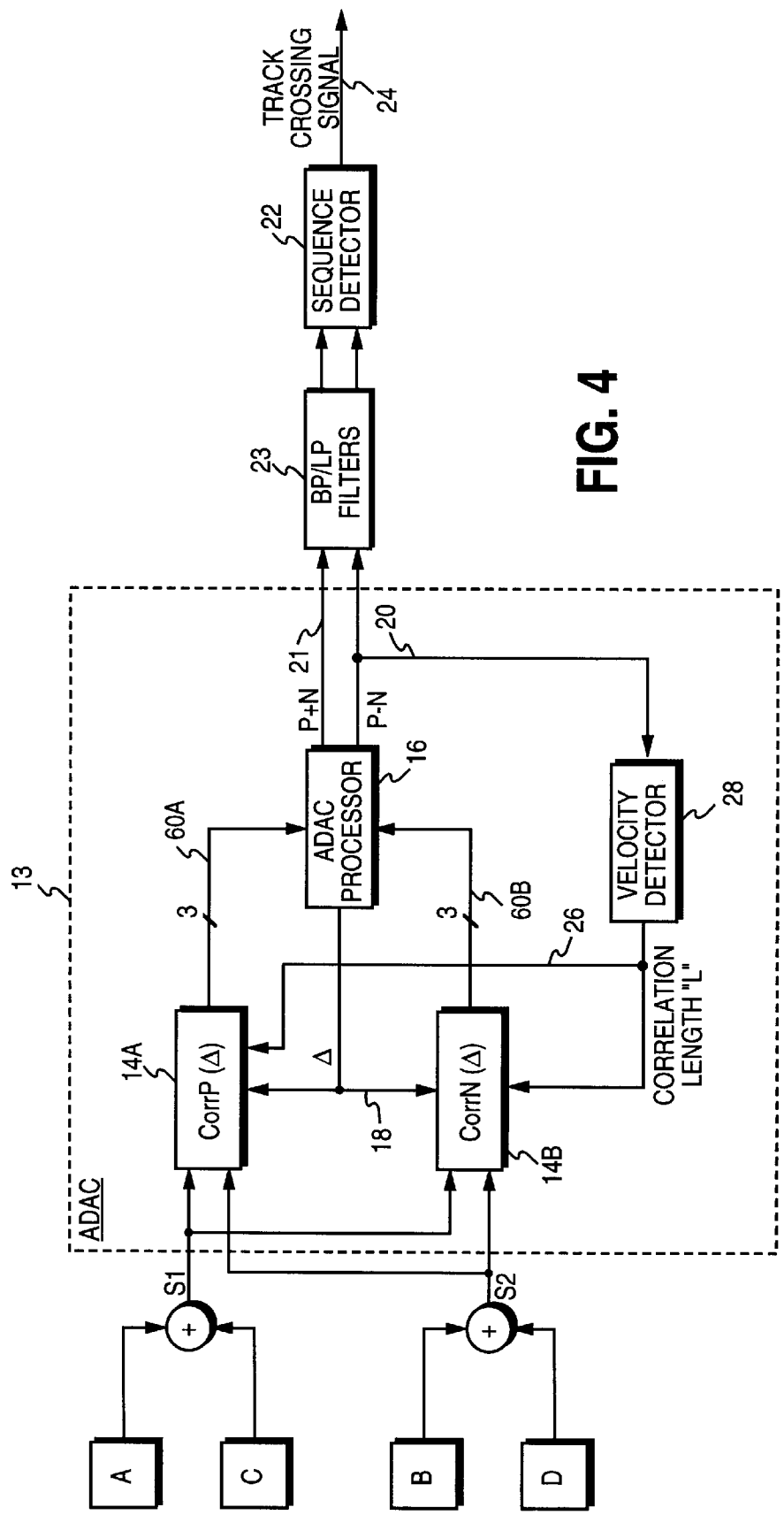
FIG. 4 is a block diagram of the adaptive length dual arm correlator and quadrature signal sequence detector of the present invention.

The present invention generates a quadrature signal for detecting track crossings by sampling the diagonal signals from a four-quadrant photodetector, correlating the sampled diagonal signals to generate positive and negative correlation signals CorrP and CorrN, adding and subtracting the correlation signals to generate a first and second position error signals that are in quadrature, and detecting a track crossing signal from the quadrature signal using a discrete time sequence detector. An overview of the circuitry to implement this technique is shown in FIG. 4.

The diagonal signal S1 is generated by adding the output of the photodetectors A+C, and the diagonal signal S2 is generated by adding the output of photodetectors B+D. As described in greater detail below with reference to FIG. 10, the photodetector signals A, B, C and D are sampled and the addition operation implemented in discrete time as an OR operation. Thus, the diagonal signals S1 and S2 in FIG. 4 are actually discrete time signals S1(n) and S2(n). The diagonal signals S1 and S2 are correlated using an adaptive dual arm correlator (ADAC) 13, the details of which are disclosed below. The ADAC 13 computes positive and negative correlation signals CorrP 60A and CorrN 603 which are added P+N 21 and subtracted P−N 20 to generate first and second position error signals (PES) which are in quadrature. The PES signals 20 and 21 are then filtered by a bandpass/lowpass filter 23 to extract the track crossing harmonic, and the filtered signals processed by a discrete time sequence detector 22. The discrete time sequence detector 22 generates a track crossing signal 24 by effectively filtering out spurious pulses in the quadrature signal (the first and second PES signals P−N 20 and P+N 21), and a servo controller (not shown) processes the track crossing signal 24 to generate the appropriate servo control signals for controlling the motion of the sled assmebly 8 and OL carriage 11. At the beginning and end of seeks, when the track crossing velocity is very slow, the servo controller processes the filtered PES signals P−N 20 and P+N 21 directly since the output 24 of the sequence detector 22 is not valid at this time.

Dual Arm Correlator

In the present invention, the dual arm correlation (DAC) is computed as the difference between a positive correlation and a negative correlation of the diagonal signals S1(n) and S2(n) at a predetermined correlation offset $$DAC(\Delta) = \sum_{1}^{L} S1(n) \otimes S2(n - \Delta) - \sum_{1}^{L} S2(n) \otimes S1(n - \Delta)$$

where the first term represents the positive correlation and the second term represents the negative correlation. In the above equation, L is the length of the correlation which is carried out by summing the XNOR (i.e., $\overline{XOR}$ denoted $\otimes$) of the corresponding L-bits in the binary signals S1(n) and S2(n).

Figure 1:
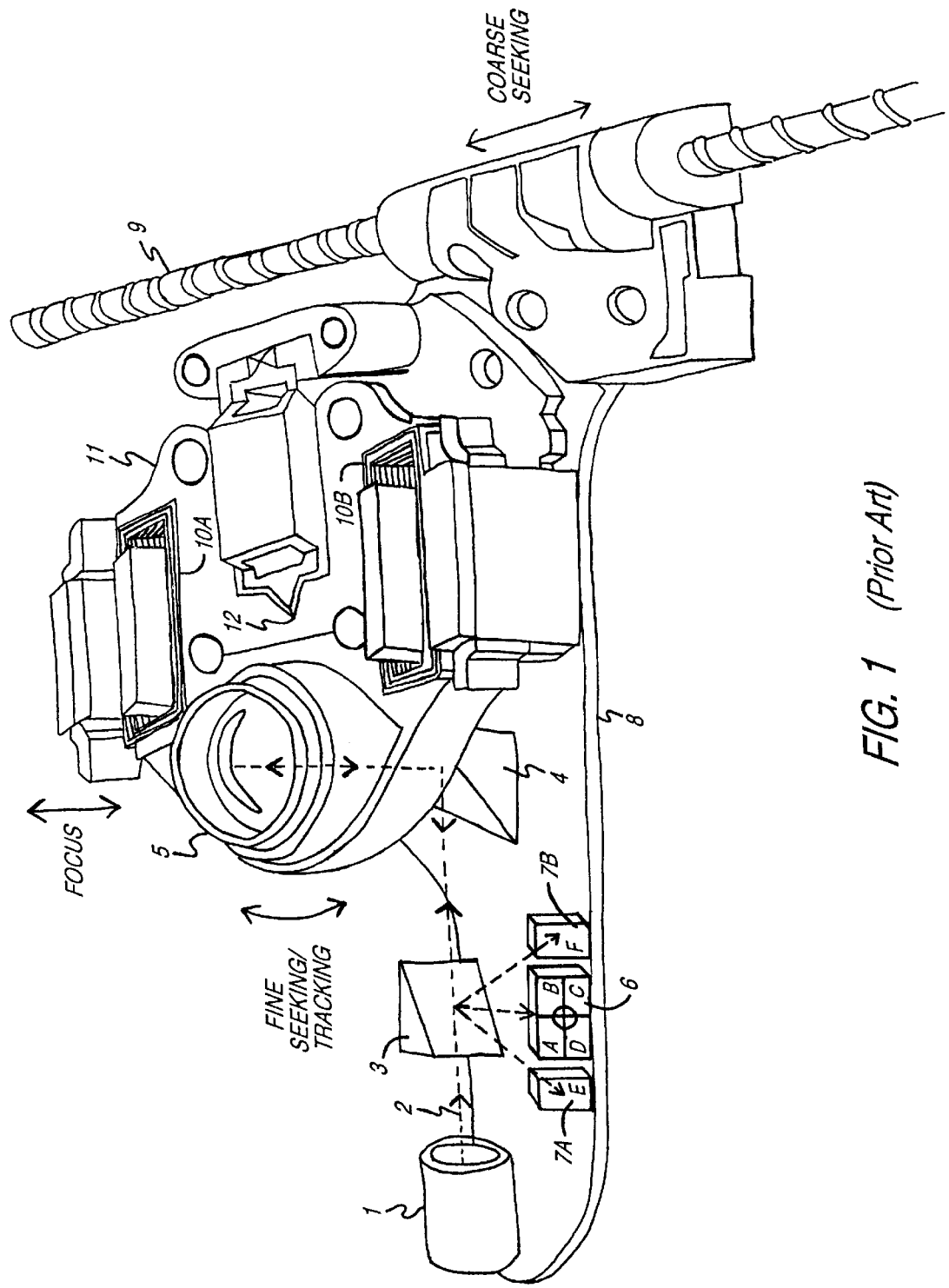
FIG. 1 shows a conventional optical head assembly positioned radially over the disk by means of a lead screw and optical carriage, where the tracking error signal (TES) is computed using the output of a four-quadrant photodetector.
Figure 2A:
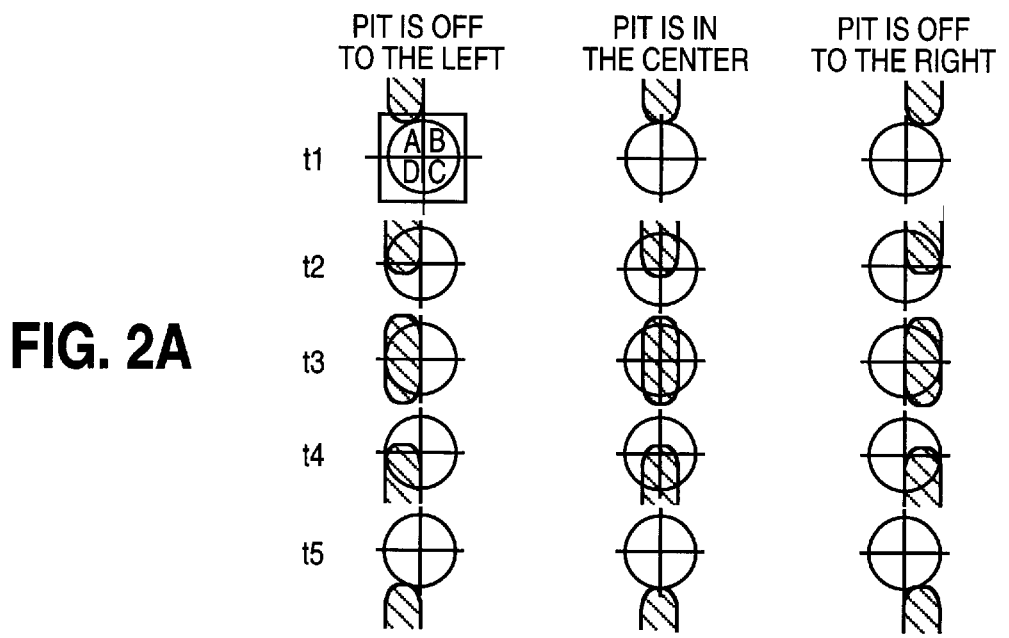
FIG. 2A–2C illustrate operation of a conventional differential phase error detector for computing the position error during tracking.
Figure 2B:
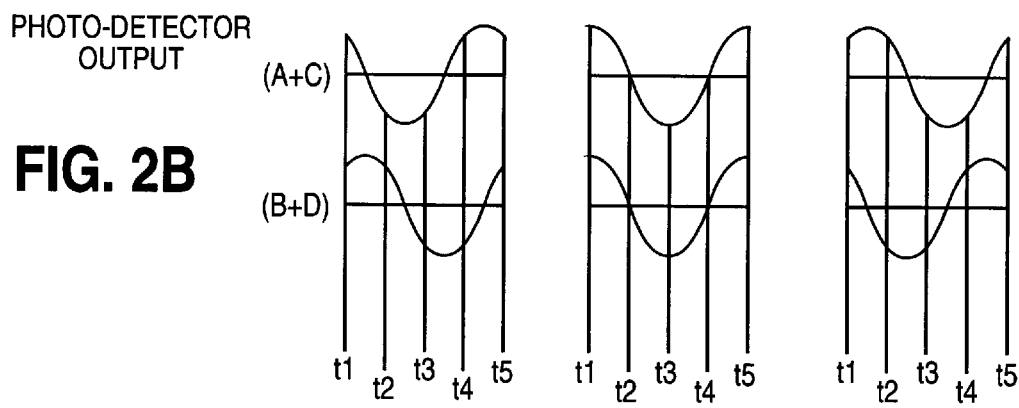
Figure 2C:
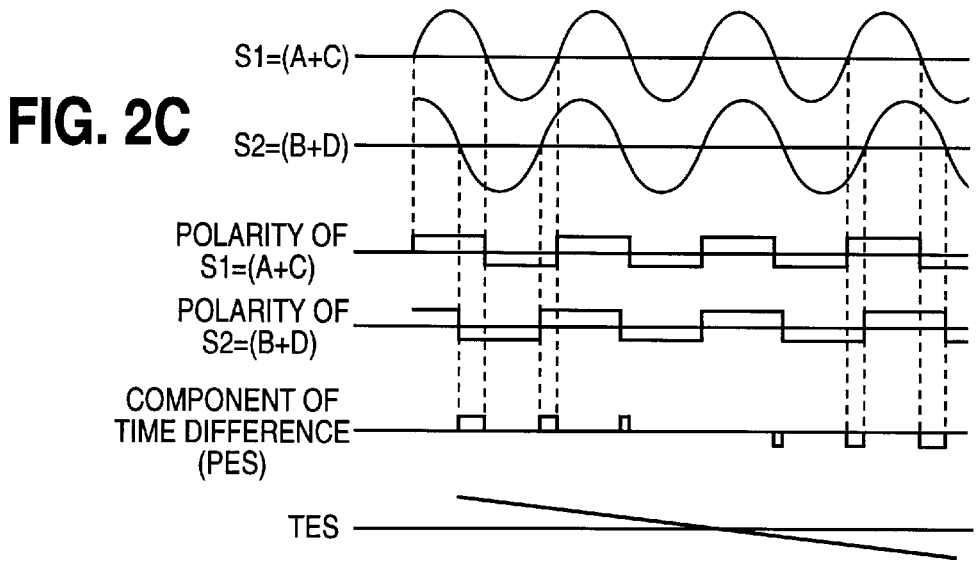
Figure 3A:
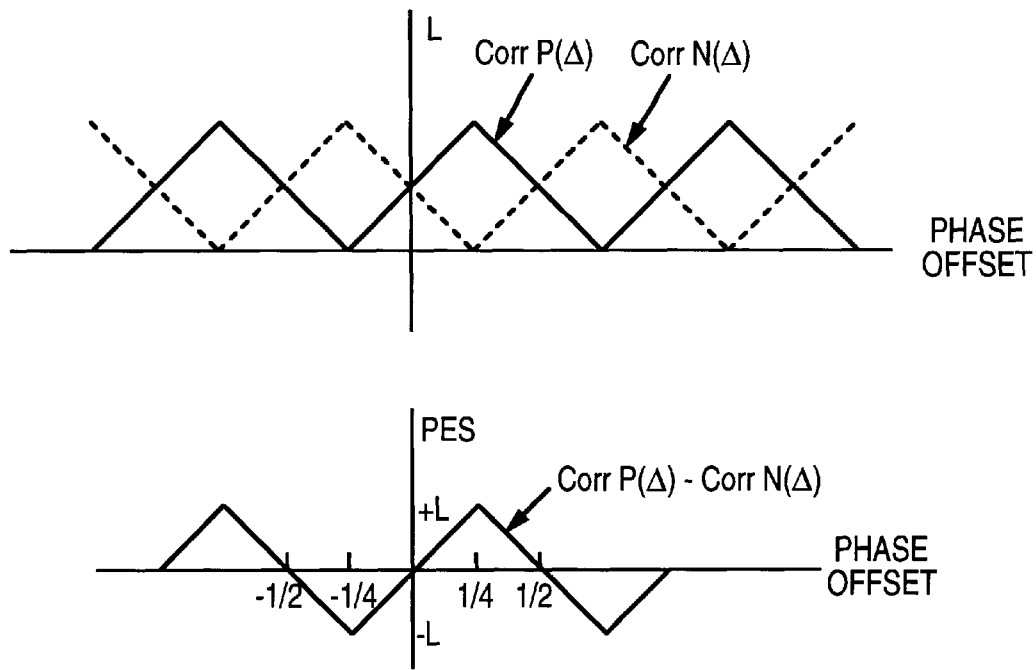
FIG. 3A shows the waveforms according to the dual arm correlation technique of the present invention for generating the position error signal during tracking.

FIG. 3A shows the waveforms corresponding to the positive correlation CorrP(Δ) and the negative correlation CorrN(Δ), as well as the resulting position error signal (PES) computed as the difference between the positive and negative correlations. The x-axis represents the phase offset between the diagonal signals S1 and S2, which is also the position error. In this embodiment, the correlation offset Δ remains fixed at approximately ¼ the period of S1 and S2. Notice that the maximum range of PES in this embodiment is only plus or minus one-quarter of a track. If the correlation offset is not set to ¼ the period of S1 and S2, or if the frequency of S1 and S2 drift due to variations in angular velocity of the disk, then the maximum track range for PES is reduced even further. Furthermore, because the correlation offset Δ is fixed, the positive and negative correlations are sensitive to the frequency content of the recorded data which results in undesirable gain variance similar to the prior art differential phase error detectors described above.

Adaptive Dual Arm Correlator

Figure 3B:
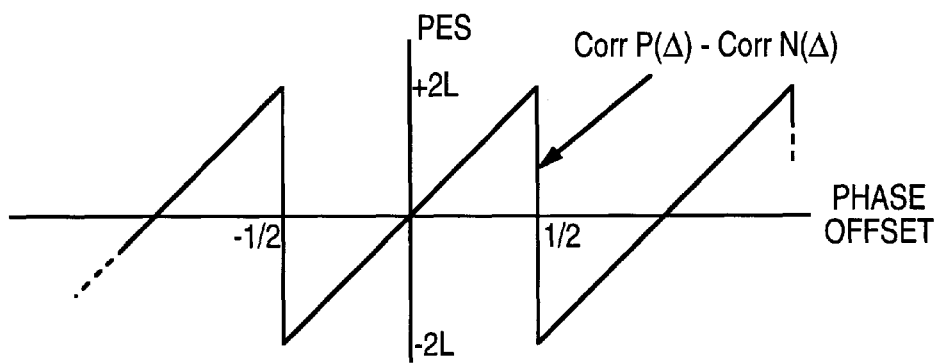
FIG. 3B shows the waveforms according to the adaptive dual arm correlation technique of the present invention which is insensitive to the frequency content of the recorded data and provides an increase in range to plus or minus one-half a track.

In order to increase the range of the PES to one-half a track, as well as compute the PES in a manner that is insensitive to the frequency content of the recorded data, the present invention employs an adaptive dual arm correlator (ADAC). The ADAC of the present invention adaptively adjusts the correlation offset Δ in order maximize the correlation between S1 and S2. In this manner, the instantaneous correlation offset Δ represents the phase offset between the diagonal signals S1 and S2 over a range of plus or minus one-quarter of a track, and the difference between the positive and negative correlations CorrP(Δ) and CorrN (Δ) represents the phase offset (i.e, PES) over a range extending to plus or minus one-half of a track as shown in FIG. 3B. Additionally, the ADAC of the present invention is substantially insensitive to the frequency content of the recorded data which allows for a higher servo tracking bandwidth due to a reduction in gain variance.

FIG. 4 shows a block diagram overview of the ADAC differential phase error detector 13 of the present invention. The quadrants A and C of the photodetector are added to generate the diagonal signal S1, and the quadrants B and D are added to generate the diagonal signal S2. The diagonal signals S1 and S2 are then input into a positive correlator CorrP(Δ) 14L and a negative correlator CorrN(Δ) 14B, both of which generate three correlation signals which are input into an ADAC processor 16 for use in computing the updated correlation offset Δ18 as described in more detail below with reference to the flow diagram of FIG. 12.

The ADAC processor 16 computes two position error signals: PES 20 as the difference between the positive and negative correlations P−N, and PES 21 as the addition of the positive and negative correlations P+N. The PES signals 20 and 21 are sinusoids ninety degrees out of phase; therefore, the PES signals 20 and 21 are in quadrature. The PES signals 20 and 21 are bandpass or lowpass filtered 23 to extract the track crossing harmonic as described below with reference to FIG. 5, and the filtered PES signals are input into a sequence detector 22 which detects a track crossing signal 24 for use in counting the number of tracks the optical transducer crosses during a seek operation. The discrete time sequence detector 22 effectively filters out spurious pulses in the quadrature PES signals 20 and 21 as described in more detail below.

During seek operations, the length L 26 of the correlations is programmably adjusted relative to the track crossing velocity such that the positive and negative correlators output a substantially constant number of correlations per track crossing. The following equation describes the desired correlation length:

$$L = \frac{4 \cdot F_s}{F_{P-N} \cdot \#SAMPLES}$$

where $F_s$ is the master clock frequency (system clock), $F_{P-N}$ is the track crossing frequency or velocity, and #SAMPLES is the desired number of samples in the PES signals 20 and 21 per track crossing. The value selected for #SAMPLES determines the complexity and performance of the sequence detector described below. In the preferred embodiment, #SAMPLES equals eight but it can be set higher or lower depending on the characteristics of the storage device and the desired performance. A velocity detector 28 detects the track crossing frequency $F_{P-N}$ and adjusts the correlation length L(k) 26 according to the following equations:

$$L(k) = L(k-1) + Ke \cdot \text{error}(k)$$

$$\text{error}(k) = \left(\frac{1}{8} \cdot \sum_{i=k-7}^{k} F_{CLKS}(i)\right) - \#SAMPLE$$

where $F_{CLKS}$ is the number of $4 \cdot F_s/L$ clocks between every other P−N zero crossing. Thus, the velocity detector 28 of FIG. 4 implements the above error(k) equation by processing the P–N PES signal 20 to detect zero crossings, counting the number of FCLKS between every other P–N zero crossing, and subtracting the #SAMPLES expected between a P–N zero crossing. The first term in the above error(k) equation is a simple low pass averaging filter for averaging the detected number of $F_{CLKS}$ between every other P–N zero crossing; this filter can be adjusted to achieve different levels of performance.

Figure 10:
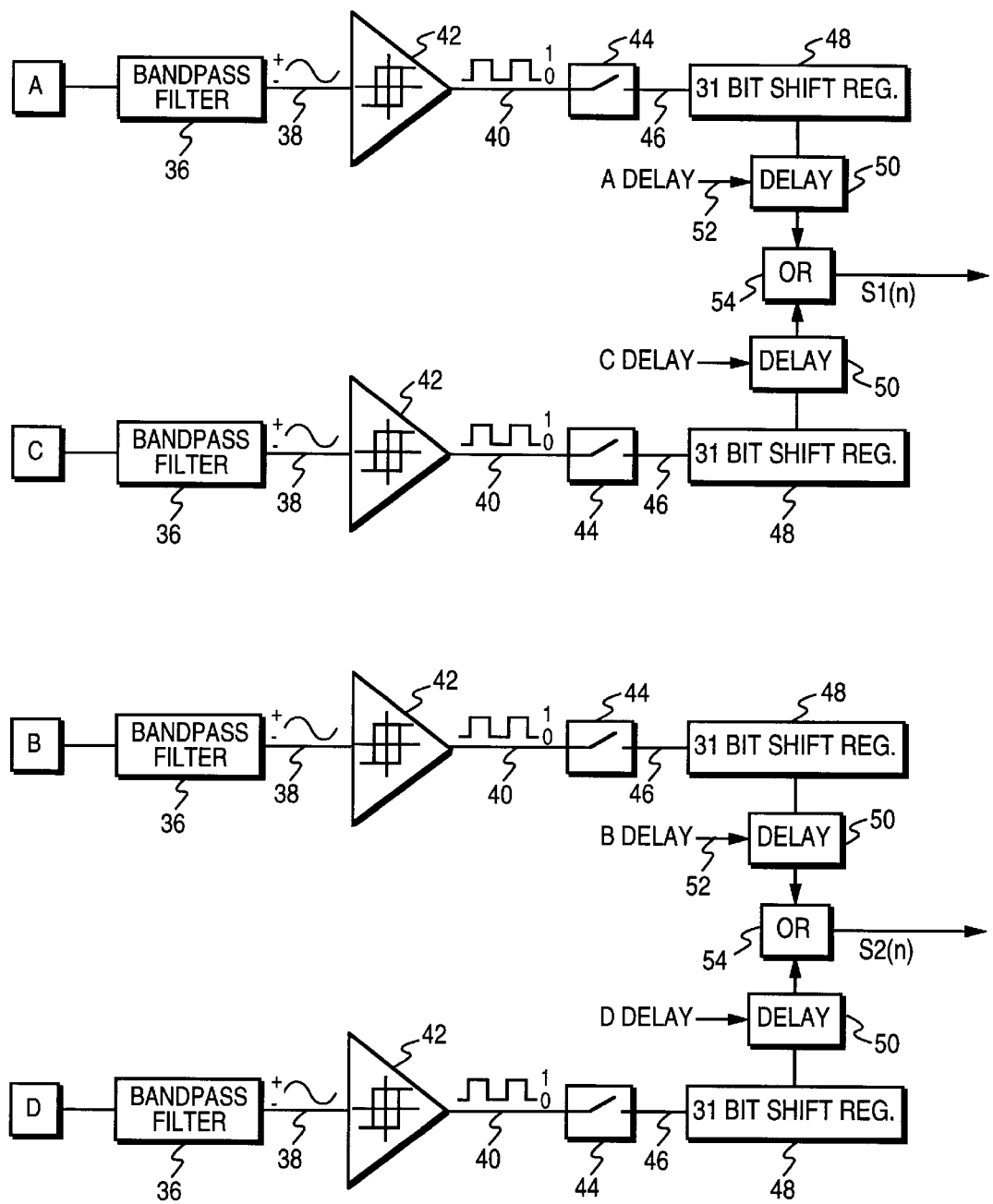
FIG. 10 shows details on the preferred embodiment for sampling the four-quadrant photodetector signals and for generating the diagonal signals S1 and S2.

Referring now to FIG. 10, shown is the preferred embodiment for the front-end circuitry for sampling the photodetector signals A, B, C, and D, and generating the diagonal signals S1(n) and S2(n). A bandpass filter 36 filters the photodetector signals to attenuate the DC component (including the track crossing frequency) and to attenuate aliasing noise. The sinusoidal signals 38 output by the bandpass filter 36 are converted into polarity square wave signals 40. The conversion is achieved by passing the sinusoidal signals 38 through polarity comparators 42 that use hysteresis to prevent extraneous pulses in the output around the zero crossings. The polarity square waves are then sampled 44 and converted into binary square wave signals 46 that are shifted into 31-bit shift registers 48. The shift registers 48 allow the user to selectively delay the photodetector signals with respect to one another in order to calibrate the servo control system according to the particular characteristics of the storage device. The delay elements 50 are implemented as a multiplexer for selecting the appropriate output of the shift registers 48 according to the delay value asserted over control line 52. The diagonal signals S1(n) and S2(n) are then generated by ORing 54 the binary square wave signals output by the delay elements 50 to generate the signals (A+C) and (B+D), respectively. The diagonal signals S1(n) and S2(n) are then input into the positive and negative correlators CorrP($\Delta$) 14A and CorrN ($\Delta$) 14B of FIG. 4.

Figure 11:
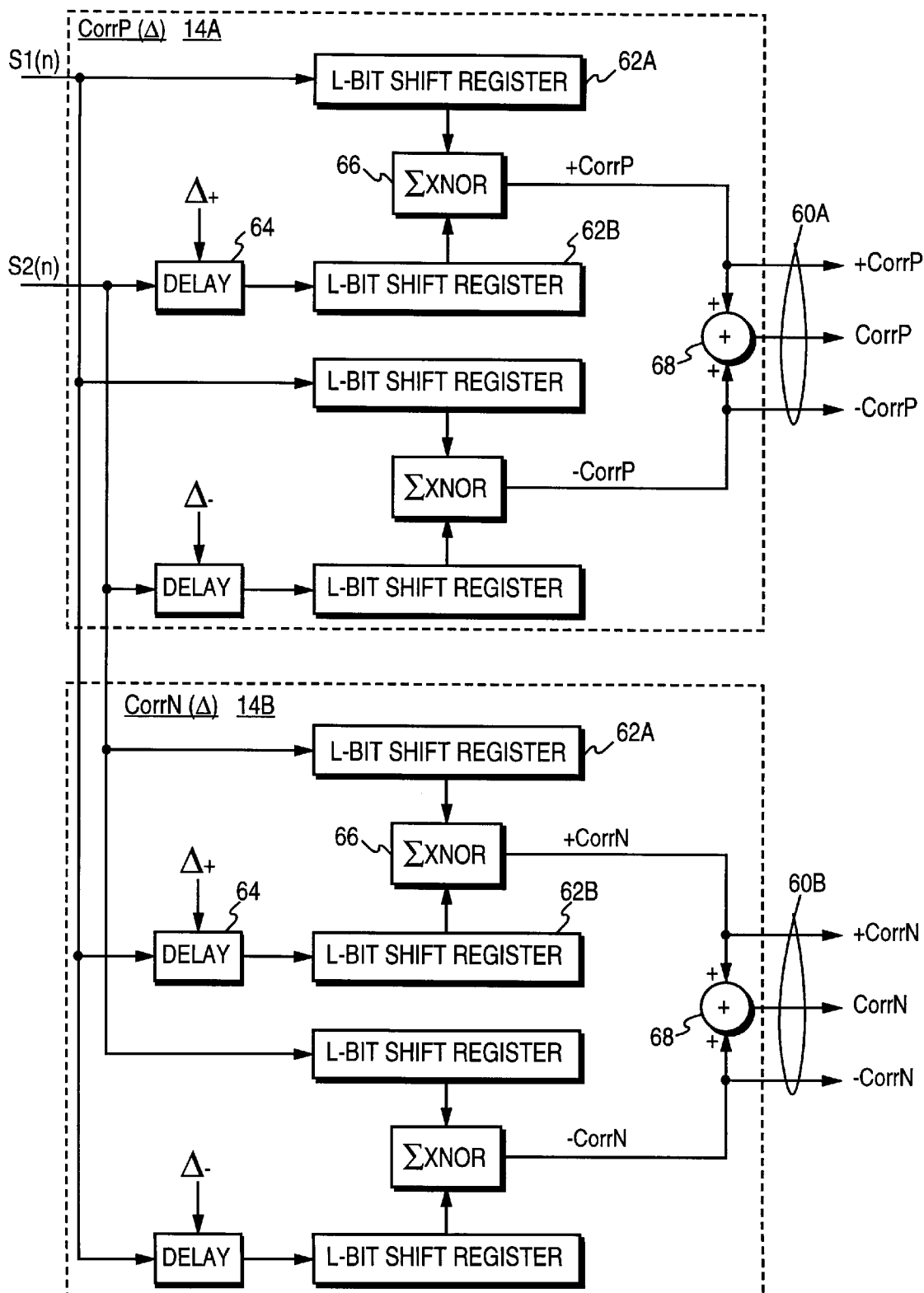
FIG. 11 shows details of the positive and negative correlators CorrP($\Delta$) and CorrN($\Delta$) which compute their respective correlations by adding adjacent correlations at $\Delta+$ and $\Delta-$.

Further details of the positive and negative correlators CorrP($\Delta$) 14A and CorrN($\Delta$) 14B are shown in FIG. 11. Part of the adaptive algorithm is to compute two correlations separated by a predetermined offset for each of the positive and negative arms designated ±CorrP and ±CorrN. The correlation offset $\Delta$ is then adaptively adjusted in a direction that maximizes the positive or negative correlation as described below. Thus, the positive correlator CorrP($\Delta$) 14A computes +CorrP according to a correlation delay $\Delta$+, and computes a positive correlation –CorrP according to a correlation delay $\Delta$–, where $\Delta$– is slightly smaller than $\Delta$+. Similarly, the negative correlator CorrN($\Delta$) 14B computes negative correlations +CorrN and –CorrN using the correlation offsets $\Delta$+ and $\Delta$–, respectively.

To compute the correlation signal +CorrP, the diagonal signal S1(n) is shifted undelayed into a first L-bit shift register 62; and the diagonal signal S2(n) is shifted into a second L-bit shift register 62B after being delayed by $\Delta$+ 64. The length L of the shift registers determines the length of the correlation. The correlation signal +CorrP is generated by summing the XNOR 66 of the corresponding bits stored in the shift registers 62A and 62B, where XNOR (denoted $\otimes$) is an inverted XOR function $$+CorrP(\Delta+) = \sum_{1}^{L} S1(n) \otimes S2(n - \Delta+).$$

Similar circuitry is provided to generate the correlation signal –CorrP using $\Delta$– as the correlation offset. The correlation signals +CorrP and –CorrP are then added at adder 68 to generate the positive correlation signal CorrP.

The negative correlator 14B for computing the negative correlation signals +CorrN, –CorrN and CorrN comprises the same circuitry as the positive correlator 14A of FIG. 11 except that S2(n) is undelayed and S1(n) is delayed by the correlation offsets $\Delta$+ and $\Delta$–.

In the preferred embodiment, the correlation is computed at a frequency of once per L/4 bits shifted into the shift registers. That is, the correlation frequency is 4/L times the sampling frequency of the diagonal signals S1 and S2 such that each correlation is computed with L/4 new samples of S1(n) and S2(n). For tracking operations, the length and frequency of the correlation can be programmably adjusted in order to optimize the phase error detector based on system dynamics such as the linear velocity of the disk at a particular track.

Figure 12:
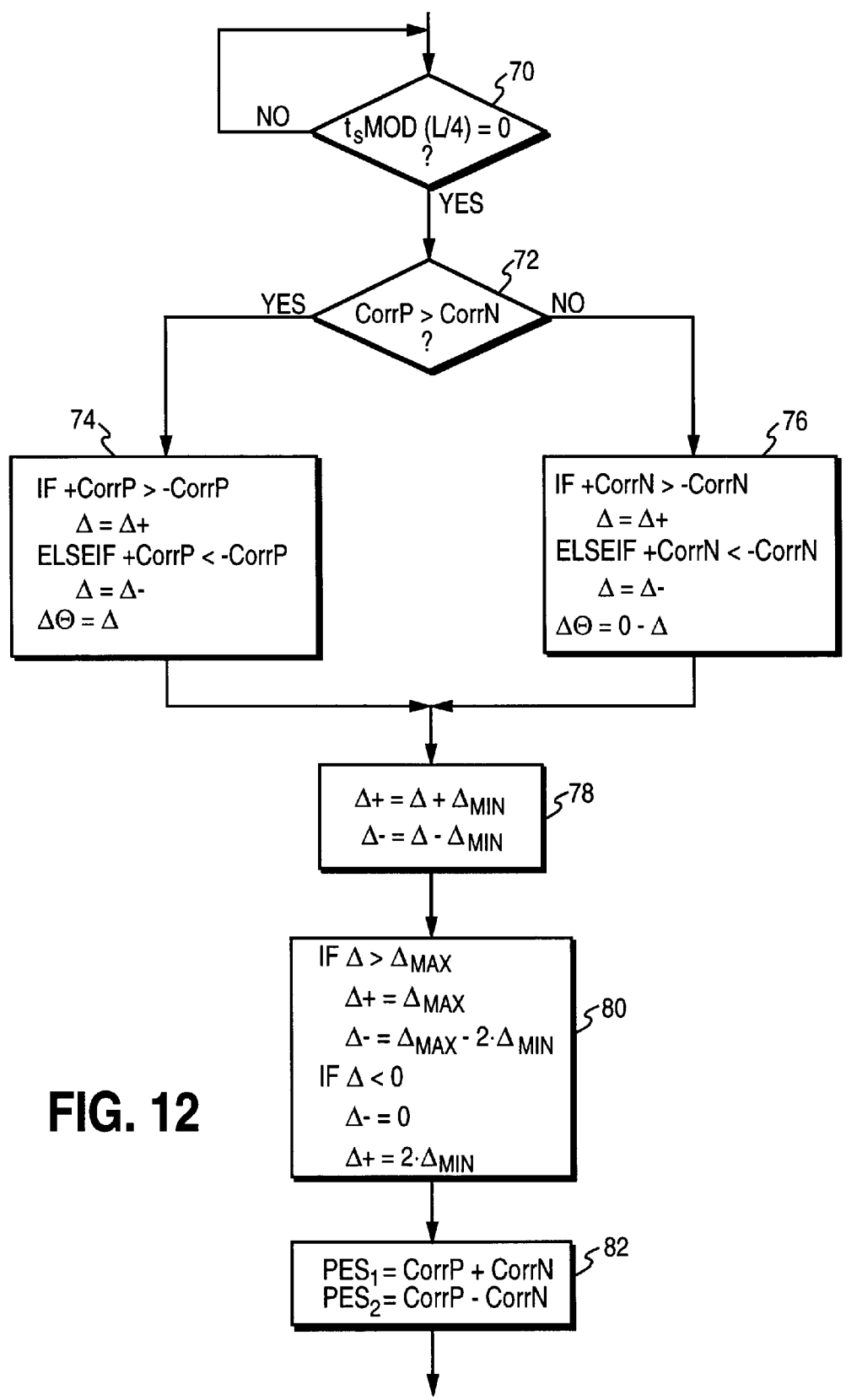
FIG. 12 is a flow diagram showing how the correlation offset $\Delta$ is adaptively adjusted to maximize the positive or negative correlations.

The positive correlation signals (+CorrP, CorrP, –CorrP) 60A and the negative correlation signals (+CorrN, CorrN, –CorrN) 60B are transferred to the ADAC processor 16 of FIG. 4 which computes the updated correlation offsets $\Delta$+ and $\Delta$– according to the flow diagram shown in FIG. 12. The flow diagram of FIG. 12 updates the correlation offsets $\Delta$+ and $\Delta$– in a direction that will maximize the positive or negative correlation values CorrP or CorrN. At step 70, the ADAC processor waits in a loop for the next correlation period (i.e., when the sampling periods $t_s$ modulo divided by L/4 equals zero). Then at step 72, the magnitude of the positive and negative correlation signals CorrP and CorrN are compared. If CorrP is greater than CorrN, then at step 74 the correlation offset $\Delta$ is updated to $\Delta$+ or $\Delta$– according to the maximum between +CorrP and –CorrP. If CorrP is less than CorrN, then at step 76 the correlation offset $\Delta$ is updated to $\Delta$+ or $\Delta$– according to the maximum between +CorrN and –CorrN. Also at steps 74 and 76, the phase offset $\Delta\Theta$ between the diagonal signals S1(n) and S2(n) is saved and used to compute the quadrature signal for seeking as described below. At step 78, the correlation offsets $\Delta$+ and $\Delta$– are updated to the current value of $\Delta$ plus and minus a predetermined offset $\Delta_{MIN}$. If the updated correlation offsets are out of range, then at step 80 they are adjusted to a maximum or minimum value as necessary. Finally, the first and second position error signals (PES) 20 and 21 are computed as the difference and sum of CorrP and CorrN at step 82.

Figure 5:
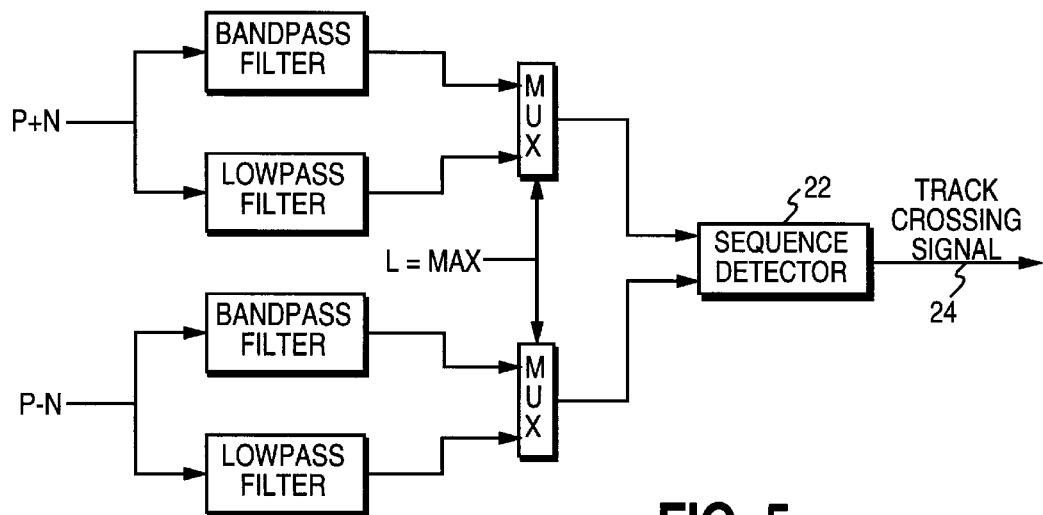
FIG. 5 shows details of the bandpass and lowpass filters of FIG. 4.

Referring again to FIG. 4, the position error signals (PES) 20 and 21 are bandpass/lowpass filtered 23 to extract the track crossing harmonic. During the seek, the track crossing harmonic is extracted with a bandpass filter when the tracking crossing velocity is above a predetermined threshold. As the read head approaches the target track and the track crossing velocity decreases, eventually the correlation length L will reach a maximum value. At this point, the track crossing harmonic is extracted with a lowpass filter which simply attenuates high frequency noise. Thus, the correlation length L is compared to a maximum value, and the result of the comparison selects the output of the bandpass or lowpass filter through multiplexers as shown in FIG. 5. At the beginning and end of seeks, when the track crossing velocity is very slow, the servo controller processes the filtered PES signals P–N 20 and P+N 21 directly since the output 24 of the sequence detector 22 is not valid when the correlation length L saturates (reaches its maximum value).

The bandpass and lowpass filters of FIG. 5 are discrete time filters clocked at the output frequency of the correlators. Consequently, the spectrum of the bandpass filter automatically scales to the track crossing harmonic since the output of the correlators are matched to the track crossing frequency as described above. In other words, it is not necessary to program the coefficients of the bandpass filter to match its spectrum to the track crossing harmonic; this is done automatically when the correlator output frequency changes by adjusting the correlation length L.

Trellis Sequence Detector

Figure 6:
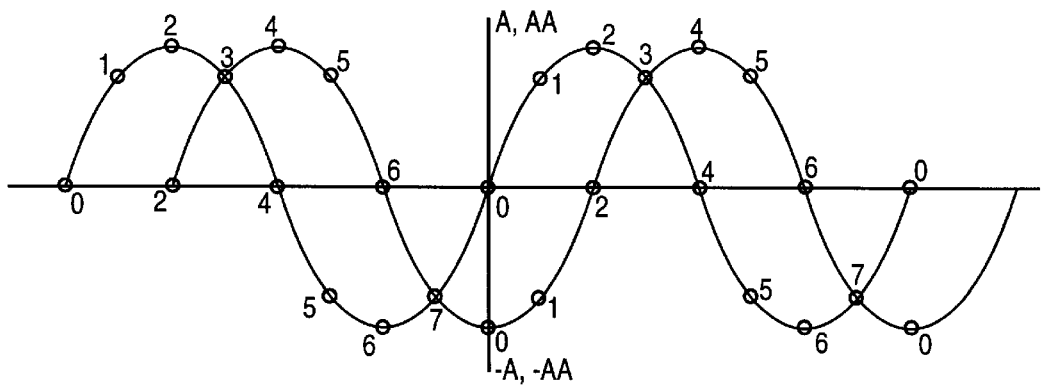
FIG. 6 shows the quadrature sinusoidal position error signals (PES) and target samples when the correlation length is adjusted to generate eight samples per track crossing.

The present invention employs a Viterbi type maximum likelihood trellis sequence detector 22 for detecting a track crossing signal 24 from the quadrature position error signals (PES) 20 and 21 (after filtering 23). After extracting the track crossing harmonic, the position error signals are sinusoidal with a 90 degree offset from one another and with respective amplitudes of ±A and ±AA as shown in FIG. 6. As described above, the correlation length L is adjusted relative to the track crossing velocity so that the correlators 14A and 14B output a predetermined number of samples per track crossing. In the preferred embodiment, the correlators are designed to output eight correlation samples per track crossing, but this is not a limiting aspect of the present invention. As described above, the number of correlation samples per track crossing can be increased or decreased depending on the desired performance versus complexity of the system.

Figure 7A:
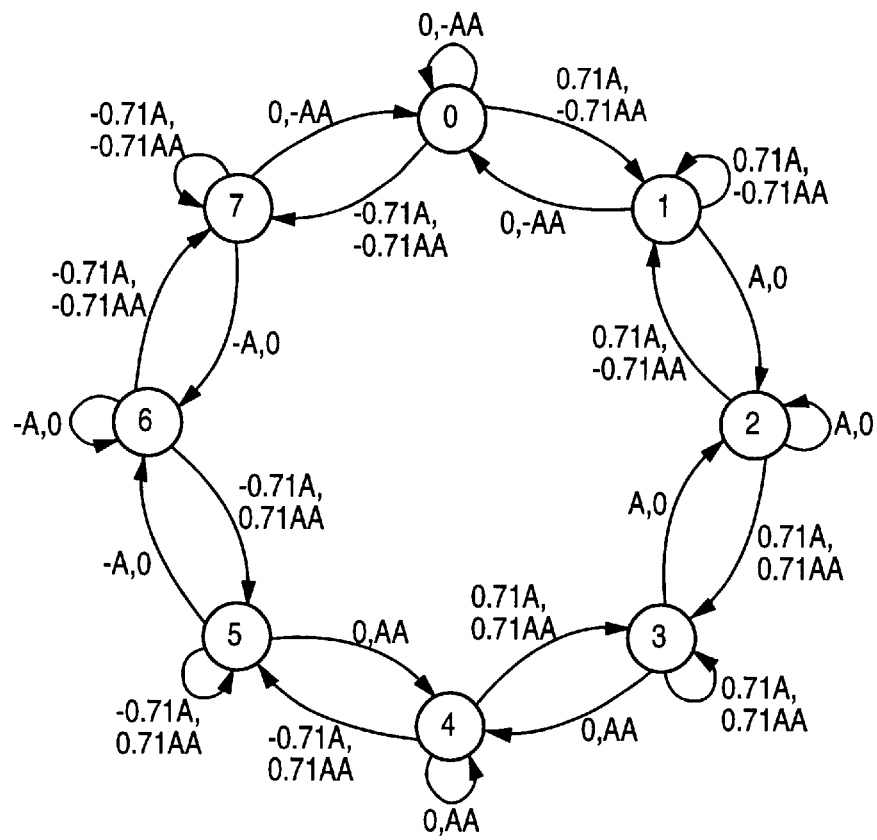
FIG. 7A is a state transition diagram of the trellis sequence detector for detecting a track crossing signal from the quadrature PES signals.

The correlation samples per track crossing are associated with target samples of the sinusoidal PES signal. For example, the eight correlation samples in the preferred embodiment are associated with eight target samples in the sinusoidal PES signals shown in FIG. 6. The eight target samples (0–7) in each PES signal correspond to eight states of a state transition diagram shown in FIG. 7A. Each state in the state transition diagram of FIG. 7A corresponds to a phase location on the sinusoidal signals of FIG. 6. The first state, state 0, corresponds to a 0 sample value in the first PES sinusoid and to a –AA sample value in the second PES sinusoid as shown in FIG. 6. The next state, state 1, corresponds to a +0.71A sample value in the first PES sinusoid and to a –0.71AA sample value in the second PES sinusoid, and so on. The transition branches leading from one state to another are labeled with the input samples that would lead to a particular next state. For example, if the current input samples correspond to state 0, and the next input samples are (0.71A, –0.71AA), then a transition occurs to state 1. As shown in FIG. 7A, the state transition sequences are contiguous due to the periodic nature of the data. The only two possible state transition sequences are in a clockwise or counter clockwise direction depending on whether the storage system is executing a forward or reverse seek.

Figure 7B:
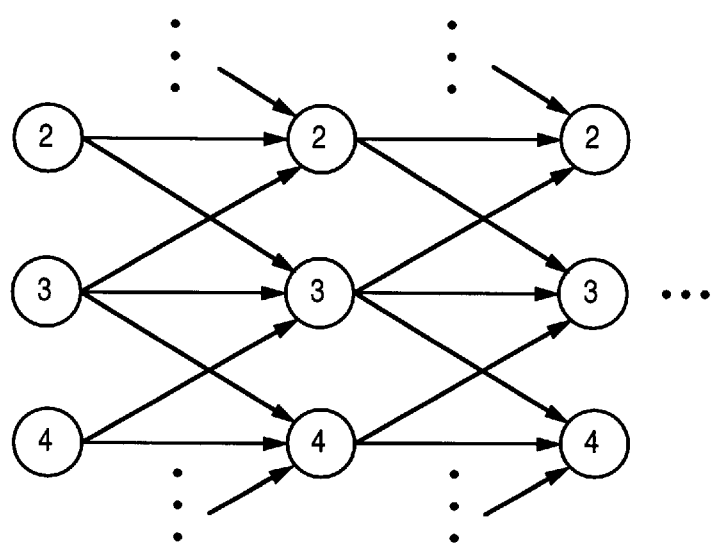
FIG. 7B shows part of a trellis diagram which corresponds to the state transition diagram of FIG. 7A.

The trellis sequence detector 22 of FIG. 4 operates according to the state transition diagram of FIG. 7A. To understand the operation, the state transition diagram is represented as a trellis, part of which is shown in FIG. 7B. The trellis in FIG. 7B represents a time sequence of input samples relative to the target samples shown in FIG. 6. The branches between the states represent the squared error between the input sample and the target sample which is referred to as an error metric. The various paths through the trellis represent the possible valid sequences associated with the target sample sequence of FIG. 6. The sequence detector 22 computes a most likely valid sequence associated with the input sample sequence by computing a squared error between the valid sequences and the input sample sequence. The valid sequence closest to the input sample sequence (in Euclidean space) is selected as the output of the sequence detector 22.

A number of candidate sequences are generated as the input samples are processed. The candidate sequences are saved in what is known as "path memories" of the detector. Notice that each state in the trellis of FIG. 7B can be reached from three different paths; however, only one of the three paths will be the most likely path, that is, the path with the smallest accumulated error metric. Thus, the most likely path is selected and the remaining paths are discarded. The candidate sequences associated with the discarded paths merge into the survivor sequences that comprise the paths that were selected. Eventually, all of the candidate sequences will merge into a single most likely sequence which becomes the output sequence. The number of candidate sequences that must be saved in the path memories equals the number of states in the trellis (i.e., eight). The path memories are designed to be long enough to ensure that the paths merge (which is a function of the signal-to-noise ratio (SNR)), but also to be as short as possible to reduce latency and circuitry cost.

Figure 8:
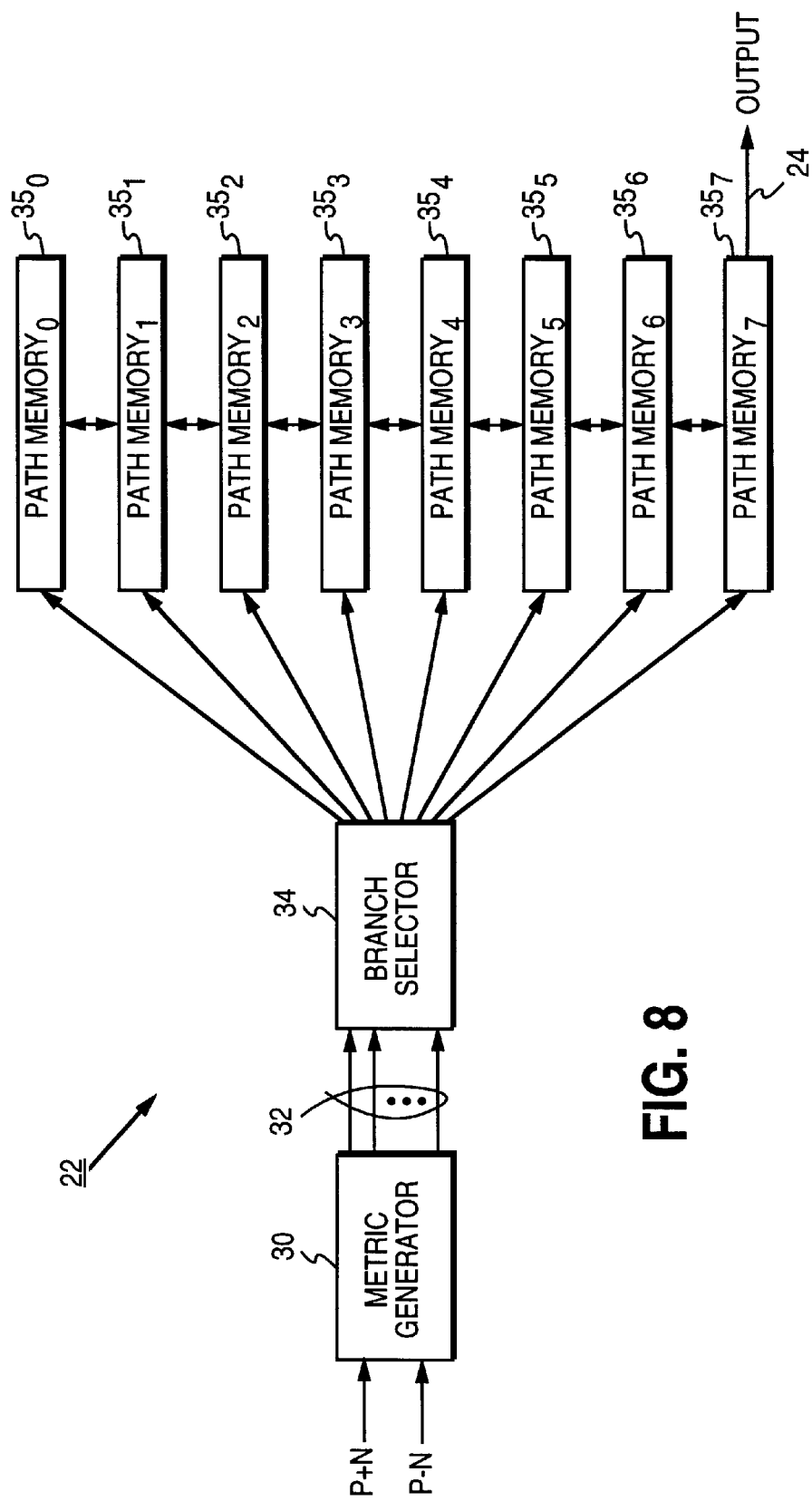
FIG. 8 is a block diagram of the trellis sequence detector which operates according to the state transition diagram of FIG. 7A.

A block diagram of the trellis sequence detector 22 and its components is shown in FIG. 8. The samples of the filtered quadrature signals P+N and P–N are input into a metric generator 30 which computes an error metric for each of the three branches into each of the eight states of FIG. 7A. In the preferred embodiment, the error metric is computed as the squared error between the actual sample values of the quadrature signals P+N and P–N and the target sample values shown in FIG. 6. In other words, the trellis sequence detector computes the most likely quadrature signal in Euclidean space. The 24 error metrics 32 are processed by a branch selector 34 which selects the branch into each of the eight states that has the smallest accumulated error metric. For each branch selected, a corresponding target sample value of FIG. 6 is loaded into the eight path memories $35_0$–$35_7$. The branch selector 34 also merges the sequences stored in the path memories $35_0$–$35_7$ which correspond to the branches not selected. Eventually, all of the sequences stored in the path memories $35_0$–$35_7$ will merge into a single most likely sequence which is selected as the output 24 of the trellis sequence detector. In FIG. 8, the output 24 of the trellis sequence detector is selected as the output of the last path memory; however, the output could be selected from any of the path memories since they all store the same merged survivor sequence. As explained above, the path memories are designed to be long enough to guarantee that the paths merge into a single survivor sequence, but also as short as possible to minimize the latency and circuitry cost.

The trellis sequence detector 22 outputs a unique discrete value for each state in the state transition diagram of FIG. 7A.

Figure 9A:
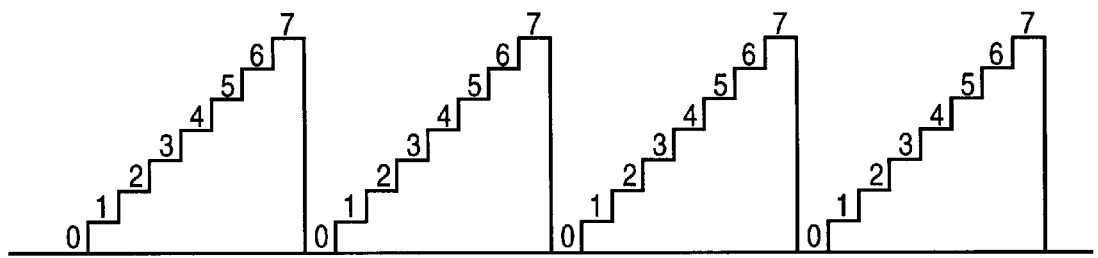
FIG. 9A and FIG. 9B show the staircased, sawtooth waveforms output by the trellis sequence detector depending on whether the storage system is executing a forward or reverse seek.
Figure 9B:
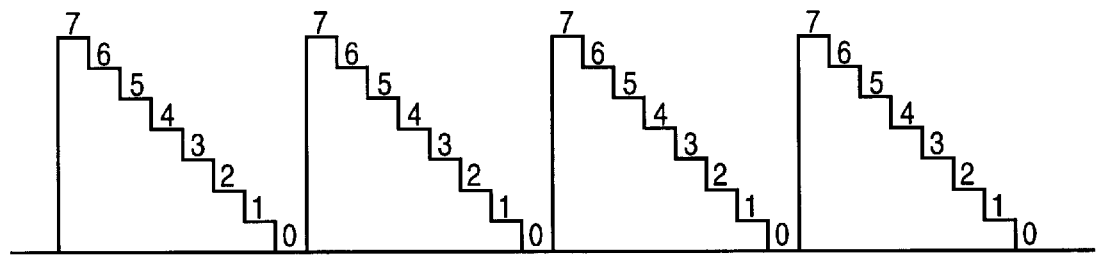

Thus, the detected track crossing signal 24 output by the sequence detector 22 is a staircased, periodic sawtooth wavefrom as shown in FIG. 9A and FIG. 9B. The wavefrom of FIG. 9A corresponds to a forward seek, and the waveform of FIG. 9B corresponds to a reverse seek. The track crossing signal 24 is processed by the servo control circuitry to determine the direction of movement and number of tracks crossed during a seek operation.

The performance enhancement provided by the trellis sequence detector 22 is to filter out spurious pulses in the quadrature PES signals (20 and 21) that can occur due to noise in the system. The sequence detector effectively replaces erroneous samples in the PES signals with valid samples that correspond to the target samples of the expected sinusoidal signals shown in FIG. 6. This improves the overall performance of the servo system during seeks by reducing the number of misdetected track crossings and/or missed track crossings.

The objects of the invention have been fully realized through the embodiments disclosed herein. Those skilled in the art will appreciate that the various aspects of the invention can be achieved through different embodiments without departing from the essential function. For example, the desired number of correlation samples per track crossing could be adjusted to achieve a varying degree of performance versus circuit complexity. As the desired number of correlation samples increases, the performance increases but the complexity also increases due to the increased number of states in the sequence detector. The particular embodiments disclosed are illustrative and not meant to limit the scope of the invention as appropriately construed by the following claims.

We claim:

1. In an optical storage device for recording digital data, a servo system for controlling the location of a light-beam reflected off of an optical storage medium, the light-beam generated by an optical transducer, the servo system comprising:
    (a) a quadrature signal generator for generating a discrete time quadrature signal indicative of the light-beam crossing data tracks recorded on the optical storage medium during a seek operation; and
    (b) a trellis sequence detector for detecting a track crossing signal from the discrete time quadrature signal by computing an estimated quadrature signal relative to sample values of the discrete time quadrature signal and target sample values of an ideal quadrature signal.

2. The servo system as recited in claim 1, wherein the trellis sequence detector comprises:
    (a) an error metric generator for generating an error metric as a function of a sample value of the discrete time quadrature signal and a target sample value of the ideal quadrature signal;
    (b) a plurality of path memories for storing sequences of ideal sample values of the ideal quadrature signal, the sequences of ideal sample values representing paths through a trellis diagram; and
    (c) a branch selector for selecting a trellis branch based on the error metric and for merging the sequences stored in the path memories based on the selected trellis branch.

3. The servo system as recited in claim 1, wherein the discrete time quadrature signal comprises first and second discrete time sinusoidal signals phase offset by 90 degrees.

4. The servo system as recited in claim 1, wherein the quadrature generator comprises a controller for controlling the number of samples in the discrete time quadrature signal per track crossing relative to the track crossing velocity of the light-beam.

5. The servo system as recited in claim 4, wherein the controller comprises:
    (a) a correlator for correlating position signals indicative of a location of the light-beam with respect to a centerline of a data track;
    (b) a velocity detector for detecting a track crossing velocity of the light-beam; and
    (c) a correlation length generator for generating a correlation length based on the track crossing velocity, the correlation length input into the correlator.

6. The servo system as recited in claim 2, wherein the quadrature generator comprises a controller for controlling the number of samples in the discrete time quadrature signal per track crossing relative to the track crossing velocity of the lightbeam.

7. The servo system as recited in claim 6, wherein the number of samples in the discrete time quadrature signal per track crossing equals a number of states in the trellis diagram.

8. The servo system as recited in claim 6, wherein the controller comprises:
    (a) a correlator for correlating position signals indicative of a location of the light-beam with respect to a centerline of a data track;
    (b) a velocity detector for detecting a track crossing velocity of the light-beam; and
    (c) a correlation length generator for generating a correlation length based on the track crossing velocity, the correlation length input into the correlator.

9. The servo system as recited in claim 5, wherein:
    (a) the position signals are discrete-time signals S1(n) and S2(n); and
    (b) the correlator computes a correlation corr ($\Delta$) according to $$corr(\Delta) = \sum_{1}^{L} S1(n)S2(n - \Delta)$$

where L is the correlation length and $\Delta$ is an integer representing a time shift between S1(n) and S2(n).

10. The servo system as recited in claim 8, wherein:
    (a) the position signals are discrete-time signals S1(n) and S2(n); and
    (b) the correlator computes a correlation corr($\Delta$) according to $$corr(\Delta) = \sum_{1}^{L} S1(n)S2(n - \Delta)$$

where L is the correlation length and $\Delta$ is an integer representing a time shift between S1(n) and S2(n).

11. In an optical storage device for recording digital data, a servo system for controlling the location of a light-beam reflected off of an optical storage medium, the light-beam generated by an optical transducer, the servo system comprising:
    (a) a servo signal generator for generating a discrete time servo signal indicative of the light-beam crossing data tracks recorded on the optical storage medium during a seek operation; and
    (b) a trellis sequence detector for detecting a track crossing signal from the discrete time servo signal by computing an estimated servo signal relative to sample values of the discrete time servo signal and target sample values of an ideal servo signal.

12. The servo system as recited in claim 11, wherein the discrete time servo signal is a discrete time quadrature signal comprising first and second discrete time sinusoidal signals phase offset by 90 degrees.

13. The servo system as recited in claim 12, wherein the trellis sequence detector comprises:
    (a) an error metric generator for generating an error metric as a function of a sample value of the discrete time quadrature signal and a target sample value of the ideal quadrature signal;
    (b) a plurality of path memories for storing sequences of ideal sample values of the ideal quadrature signal, the sequences of ideal sample values representing paths through a trellis diagram; and
    (c) a branch selector for selecting a trellis branch based on the error metric and for merging the sequences stored in the path memories based on the selected trellis branch.

14. The servo system as recited in claim 12, wherein the servo signal generator comprises a controller for controlling the number of samples in the discrete time quadrature signal per track crossing relative to the track crossing velocity of the light-beam.

15. In an optical storage device for recording digital data, a servo control method for controlling the location of a light-beam reflected off of an optical storage medium, the light-beam generated by an optical transducer, the servo control method comprising the steps of:

(a) generating a discrete time servo signal indicative of the light-beam crossing data tracks recorded on the optical storage medium during a seek operation; and (b) detecting a track crossing signal from the discrete time servo signal by computing an estimated servo signal relative to sample values of the discrete time servo signal and target sample values of an ideal servo signal.

16. The servo control method as recited in claim 15, wherein the discrete time servo signal is a discrete time quadrature signal comprising first and second discrete time sinusoidal signals phase offset by 90 degrees.

17. The servo control method as recited in claim 16, wherein the step of detecting the track crossing signal comprises the steps of:

(a) generating an error metric as a function of a sample value of the discrete time quadrature signal and a target sample value of the ideal quadrature signal;

(b) storing sequences of ideal sample values of the ideal quadrature signal in a plurality of path memories, the sequences of ideal sample values representing paths through a trellis diagram;

(c) selecting a trellis branch based on the error metric; and (d) merging the sequences stored in the path memories based on the selected trellis branch.

18. The servo control method as recited in claim 16, further comprising the step of controlling the number of samples in the discrete time quadrature signal per track crossing relative to the track crossing velocity of the light-beam.

* * * * *